United States Patent
Kiely et al.

(10) Patent No.: US 6,894,135 B2
(45) Date of Patent: May 17, 2005

(54) METHOD FOR PREPARING HIGH MOLECULAR WEIGHT RANDOM POLYHYDROXYPOLYAMIDES

(75) Inventors: Donald E. Kiely, Missoula, MT (US); Kylie Kramer, Missoula, MT (US); Jinsong Zhang, Santa Barbara, CA (US)

(73) Assignee: The University of Montana, Missoula, MT (US)

( * ) Notice: Subject to any disclaimer, the term of this patent is extended or adjusted under 35 U.S.C. 154(b) by 0 days.

(21) Appl. No.: 10/734,418

(22) Filed: Dec. 10, 2003

(65) Prior Publication Data

US 2004/0158029 A1 Aug. 12, 2004

Related U.S. Application Data

(60) Provisional application No. 60/432,575, filed on Dec. 10, 2002.

(51) Int. Cl.$^7$ .................... C08G 63/685; C08G 283/04; C08G 69/28
(52) U.S. Cl. ................ 527/312; 528/335; 528/336; 528/351; 525/540; 525/926
(58) Field of Search .............................. 528/335, 336, 528/351; 525/540, 926; 527/312

(56) References Cited

U.S. PATENT DOCUMENTS

| | | | | |
|---|---|---|---|---|
| 4,833,230 A | * | 5/1989 | Kiely et al. | 528/230 |
| 5,312,967 A | * | 5/1994 | Kiely et al. | 560/180 |
| 5,329,044 A | * | 7/1994 | Kiely et al. | 562/564 |
| 5,434,233 A | * | 7/1995 | Kiely et al. | 527/310 |
| 5,473,035 A | * | 12/1995 | Kiely et al. | 527/312 |

OTHER PUBLICATIONS

Ogata, et al.; Synthesis of Hydrophilic Polyamide by Active Polycondensation; J. Polym. Sci., Polym. Lett. Ed. (1974) vol. 12, p. 355; Tokyo, JP.

Ogata, et al.; Synthesis of Hydrophilic Polyamide from L–Tartarate and diamines by Active Polycondensation; J. Polym. Sci., Polym. Chem. Ed. (1975) vol. 13, p. 1793; JP.

Ogata, et al.; Active Polycondensation of Diethyl 2,3,4,5–Tetrahydroxyadipate with Diamines; J. Polym. Sci., Polym. Chem. Ed., (1976), vol. 14, p. 783; Tokyo, JP.

Ogata, et al.; Copolycondensation of Hydroxyl Diesters and Active Diesters with Hexamethylenediamine; J. Polym. Sci., Polym. Chem. Ed (1977) vol. 15, p. 1523; Tokyo, JP.

Ogata, et al.; Synthesis of Polyamides through Active Diesters; J. Polym. Sci., Polym. Chem. Ed. (1973) vol. 11, p. 1095; Tokyo, JP.

Ogata, et al.; Synthesis of Polyesters from Active Diesters; J. Polym. Sci., Chem. Ed. (1973) vol. 11, p. 2537; Tokyo, JP.

Ogata; New Polycondensation Systems; Polym. Prepr. (1976) vol. 17, p. 151; Tokyo, JP.

Ogata, et al.; Polycondensation Rxn of Dimethyl Tartrate with Hexamethylenediamine in the Presence of Various Matrices; J. Polym. Sci., Polym. Chem. Ed. (1980) vol. 18, p. 939.

Lin; Diverse Applications of Carbohydrate Acids in Organic Synthesis, a Dissertation; Univ. of Alabama at Birmingham (1987).

Chen; Experimental and Theoretical Studies Concerned with Synthetic Acyclic Carbohydrate Based Polyamides, a Dissertation; Univ. of Alabama at Birmingham (1992).

Kiely, et al; Hydorxylated Nylons Based on Unportected Esterified D–Glucaric Acid by Simple Condensation Reactions; J. Am. Chem. Soc. (1994) vol. 116, p. 571; Birmingham, AL.

MURAKI: Polyamides; SciFinder Scholar; Patent No. JP 48032997 A2 (1973).

* cited by examiner

Primary Examiner—Samuel A. Acquah
(74) Attorney, Agent, or Firm—Saliwanchik, Lloyd & Saliwanchik

(57) ABSTRACT

High molecular weight random polyhydroxypolyamides (PHPAs) are produced by creating prepolymers which are further polymerized. Random prepolymers are formed from a stoichiometrically molar balance (1:1) starting material. The starting material is a 1:1 stoichiometrically balanced esterified aldaric acid:alkylene or alkylene derived diammonium salt. Alternatively, the starting material is an esterified stoichiometrically balanced diacid:diamine salt and a N'-ammoniumalkyl (or alkyl derived)-D-aldaramic acid terminal carboxylate zwitterionic salt mixture. The starting materials are polymerized in a basic alcohol using a second amine. The polymerized material, or the random prepolymers, are isolated and then further polymerized in a solvent, typically a mixed solvent of an alcohol and non-alcohol, to obtain the high molecular weight PHPAs.

2 Claims, No Drawings

METHOD FOR PREPARING HIGH MOLECULAR WEIGHT RANDOM POLYHYDROXYPOLYAMIDES

CROSS REFERENCE TO RELATED APPLICATIONS

This application claims priority to U.S. Provisional Patent Application Ser. No. 60/432,575, filed Dec. 10, 2002.

The subject invention was made with government support under a research project supported by the United States Department of Agriculture, Grant No. 2001-344463-10521. The government has certain rights in this invention.

BACKGROUND OF THE INVENTION

Solution condensation polymerizations of esterified, but unprotected, carbohydrate diacids (aldaric acids) with alkylenediamines to give polyhydroxypolyamides were first reported by Ogata and coworkers[1-8] who utilized diesters of acyclic L-tartaric acid[1,2] and galactaric (mucic)acid[3,4] as diacid monomers. D-glucaric,[9-14] meso-xylaric,[9,10,15,16] and D-mannaric acid[11,14] based polyhydroxypolyamides (PHPAs) were described more recently by others. The primary structural differences between those polymers having alkylendiamine units in common, originate from the variable stereochemistry and number of carbon atoms in the diacid monomer units.

The patent of Kiely and Lin[10] describes the preparation of polyhydroxypolyamides from several esterified aldaric acids (carbohydrate diacids) with a number of alkylenediamines, polymerization being carried out without concern for controlling the stereochemical alignment of the diacids, all of which contain chiral carbons. The report of Kiely, Chen and Lin[12] describes PHPAs derived only from D-glucaric acid, but with a variety of diamines, including alkylenediamines, diamines with heteroatoms (heterodiamines) in place of one or more carbons in the diamine chain, and arylalkyldiamines. In all of the above preparations of PHPAs, no control of stoichiometry is indicated, and the diacid and diamine monomers are not in an exact 1:1 (molar) stoichiometric relationship in the reaction mixtures. Having a 1:1 molar ratio between reacting monomers is a requirement for forming high molecular weight polymers ([17], pp 274–275) by a condensation polymerization process. Consequently, the reported number average molecular weights ($M_n$) of the PHPAs derived from alkylenediamines as above are typically relatively low and below 3,000. The polyamides have low solubility in methanol, the reported solvent of choice for polymerization, a condition which limits their molecular weights. The report of Morton and Kiely[18] describes PHPAs from D-glucaric acid and D-galactaric acid with a number of diamines that also contain a heteroatom or heteroatoms in place of diamine carbon atoms. The resulting polyamides have higher methanol solubility than do those derived from alkylenediamines, which results in significantly higher molecular weights for the PHPAs that precipitate from solution. What these literature sources tell us is: a) that higher molecular weight PHPAs, particularly those with low methanol solubility, are likely to be only achieved by strict control of stoichiometry between the diamine and aldaric acid units, but does not explicitly indicate how this stoichiometry can be achieved in a practical manner; b) enhanced solubilization of the growing polymer is imperative if significantly higher molecular weights are to be achieved.

All patents, patent applications, provisional patent application and publications referred to or cited herein, or from which a claim for benefit of priority has been made, are incorporated by reference in their entirety to the extent they are not inconsistent with the explicit teachings of the specification.

SUMMARY OF THE INVENTION

The subject invention involves a method for preparing high molecular weight stereochemically random polyhydroxypolyamides (PHPAs). Preparation of the polymers begins by forming a stoichiometrically molar balanced starting material. The starting material is formed by way of a salt and is 1:1 aldaric acid:diamine. The aldarate acid unit of the alkylene or alkylene derived diammonium aldarate is esterified with alcohol containing an acid catalyst. The 1:1 stoichiometrically balanced esterified aldaric acid:alkylene or alkylene derived diammonium salt is polymerized in alcohol made basic in the presence of a second amine to form "random prepolymers." The "random prepolymers" are further polymerized in a solvent to form the higher molecular weight stereochemically random PHPAs.

In an alternative embodiment, the starting material is a diacid: diamine salt and a N'-ammoniumalkyl (or alkyl derived)-D-aldaramic acid terminal carboxylate zwitterionic salt mixture. This starting material likewise is esterified polymerized to form "random prepolymers" and further polymerized to form the high molecular weight stereochemically random PHPAs.

The method of the subject invention produces and uses novel compounds including the stoichiometrically balanced starting materials, the random prepolymers and the high molecular weight stereochemically random PHPAs. These novel compounds are also described and claimed.

DETAILED DESCRIPTION OF THE INVENTION

The subject invention involves a process for the preparation of significantly higher molecular weight stereochemically random polyhydroxypolyamides (PHPAs), than classes of polyamides that have been previously described.

The subject process can be described generally by the following six (6) steps:

Step 1) forming an essentially stoichiometrically molar balanced (1:1) aldaric acid:diamine at the start of the process, by way of a salt, which can be purified when necessary, between the diacid and diamine components;

For example, the following illustrates the formation of D-glucaric acid (in several forms in equilibrium) in aqueous solution with $H^{3O}$ from a D-glucaric acid salt and conversion of D-glucaric acid in water to alkylene (or alkylene derived) diammonium D-glucarates or mixtures with 1 and 6-N'-ammoniumalkyl (or alkyl derived)-D-glucaramates (i.e., C6 and C1 carboxylate zwitterionic salts).

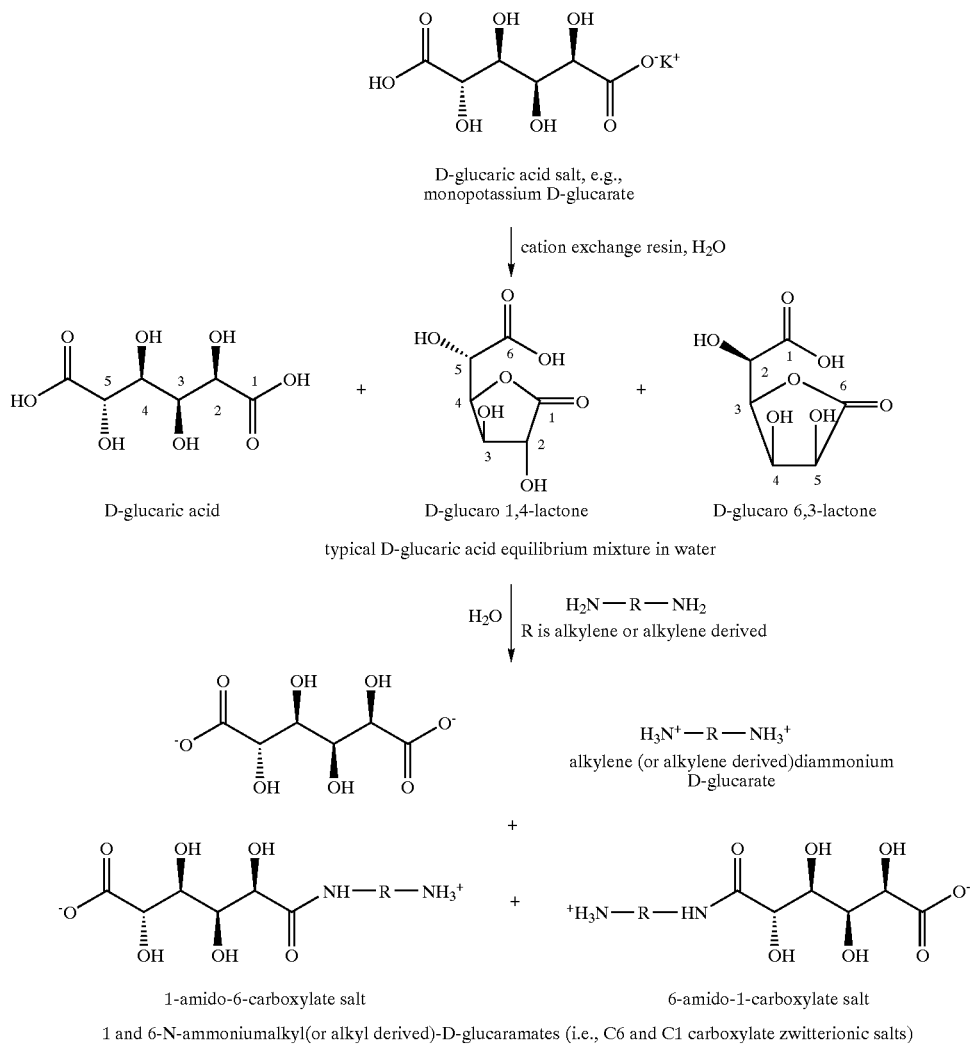
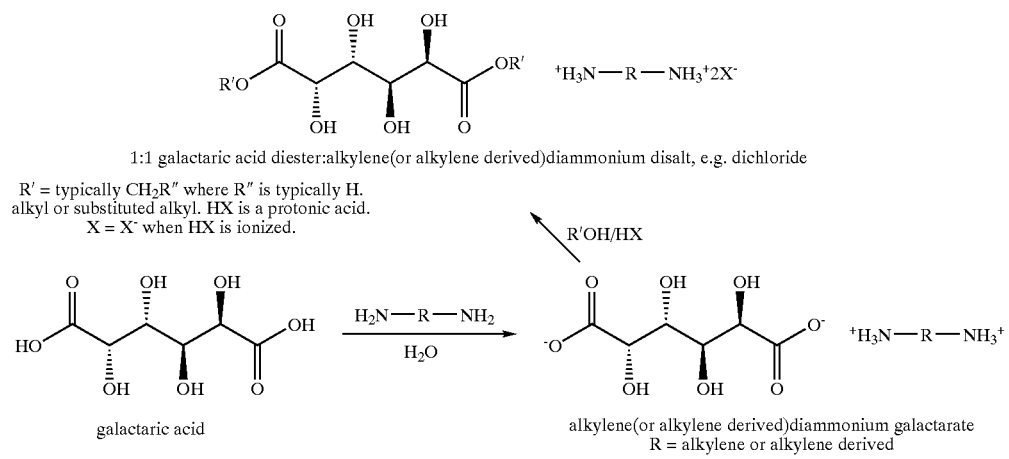
Formation of alklyene (or alkylene derived) diammonium galactarates and xylarates from the precursor aldaric acids and formation of 1:1 aldaric acid diesters (e.g., dimethyl galactarate:alkylene (or alkylene derived) diammonium disalts (e.g., dichlorides) are shown below:

-continued

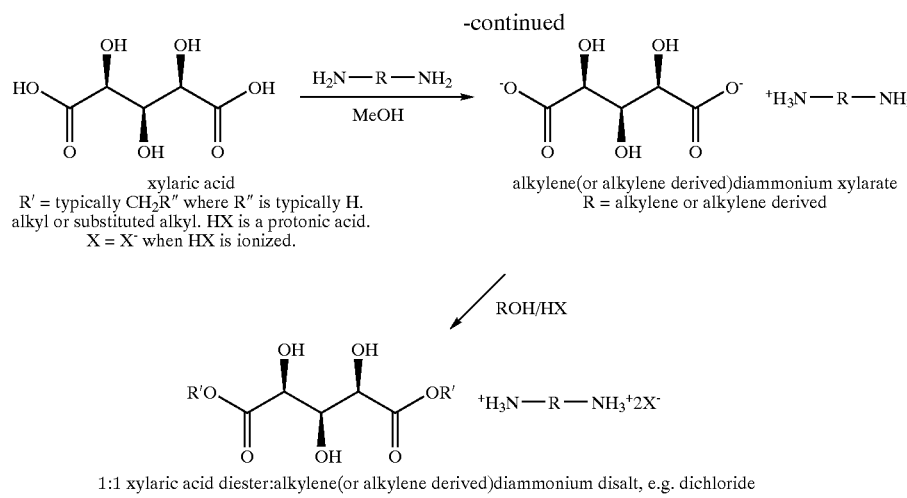

xylaric acid
R' = typically CH$_2$R" where R" is typically H, alkyl or substituted alkyl. HX is a protonic acid.
X = X$^-$ when HX is ionized.

alkylene(or alkylene derived)diammonium xylarate
R = alkylene or alkylene derived 1:1 xylaric acid diester:alkylene(or alkylene derived)diammonium disalt, e.g. dichloride Step 2) directly esterifying the aldarate acid unit of the alkylene or alkylene derived diammonium aldarate with an alcohol containing an acid catalyst, and converting the alkylene or alkylene derived diammonium aldarate unit to a diammonium dianion salt, where the anion is derived from a protic acid;

Step 3) polymerizing the 1:1 stoichiometrically balanced esterified aldaric acid:alkylene or alkylene derived diammonium salt in alcohol (typically methanol) after the solution has been made basic, generally by the use of a second amine (preferably a tertiary amine);

Step 4) isolating the polymeric product (termed the "random prepolymer"), typically by filtration or centrifugation;

Step 5) postpolymerizing the "random prepolymer" in a solvent, typically, but not limited to, a mixed solvent, one member of which is typically an alcohol, and another or other solvents being typically non-alcohols (such as dimethyl sulfoxide) but may include additional alcohols (which may be even polyhydric alcohols);

For example, the following shows conversion of alkylene (or alkylene derived) diammonium D-glucaric acid diester disalts, or as a mixture with N-ammoniumalkyl (or alkyl derived)-D-glucaramic acid ester salts first to random pre poly(alkylene or alkylene derived D-glucaramides) and then to random post poly(alkylene or alkylene derived D-glucaramides).

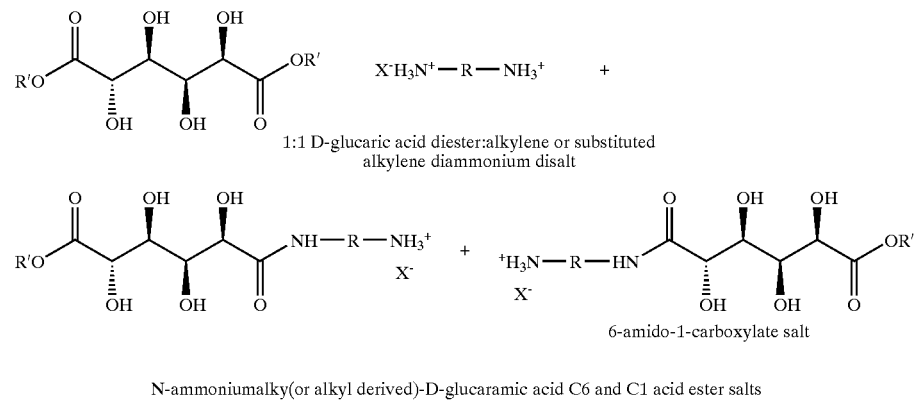

1:1 D-glucaric acid diester:alkylene or substituted alkylene diammonium disalt 6-amido-1-carboxylate salt N-ammoniumalky(or alkyl derived)-D-glucaramic acid C6 and C1 acid ester salts excess R$_3$N  R typically Et

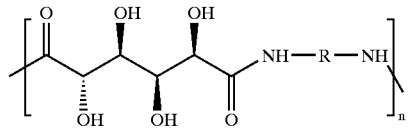

isolated random prepoly(alkylene or alkylene derived D-glucaramide)

excess R$_3$N R typically Et

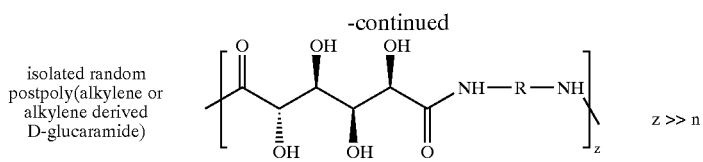

isolated random postpoly(alkylene or alkylene derived D-glucaramide)    z >> n

And, the following is an example of conversion of a 1:1 aldaric acid diester:alkylene (or alkylene derived) diammonium disalt first to a small polymer (prepolymer) followed by conversion of the prepolymer to a larger polymer (postpolymer).

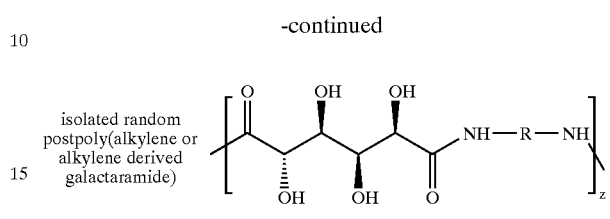

isolated random postpoly(alkylene or alkylene derived galactaramide)    z > n

Step 6) alternatively for 1, forming a diacid:diamine salt and a N'-ammoniumalkyl (or alkyl derived)-D-aldaramic acid terminal carboxylate zwitterionic salt mixture converting the alkylene (or alkylene derived) diammonium D-glucarates, or such salts in a mixture with N-ammoniumalkyl (or alkyl derived)-D-glucaramic acid carboxylate salts to the corresponding N-ammoniumalkyl (or alkyl derived)-D-glucaramnic acid ester salts which are then polymerized and postpolymerized as in steps 4 and 5.

For example,

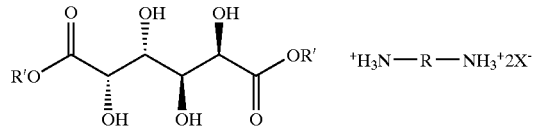

1:1 galactaric acid diester:alkylene (or alkylene derived) diammonium disalt, e.g. dichloride excess $R_3N$ | R typically Et isolated random prepoly(alkylene or alkylene derived galactaramide)

excess $R_3N$ R typically Et

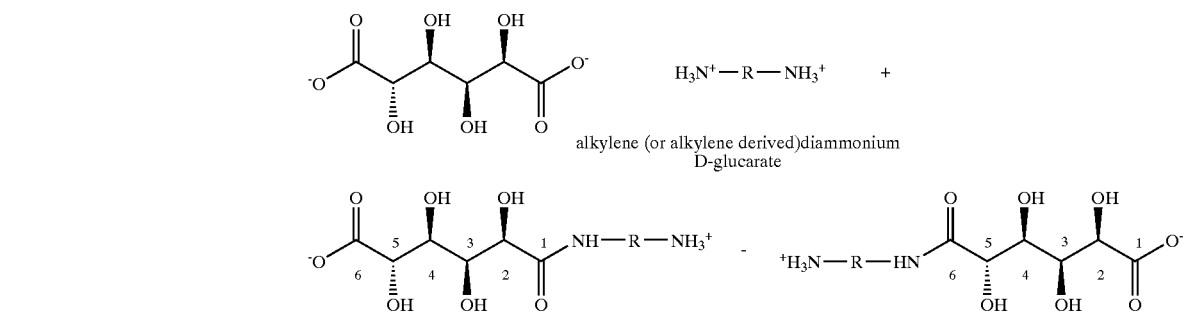

alkylene (or alkylene derived)diammonium D-glucarate

C1 and C6-N-ammoniumalky(or alkyl derived)-D-glucaramates (i.e., C6 and C1 carboxylate zwitterionic salts)

R'OH/HX | R' = typically $CH_2R''$ where R'' is typically H, alkyl or substituted alkyl. HX is a protonic acid. X =X⁻ when HX is ionized.

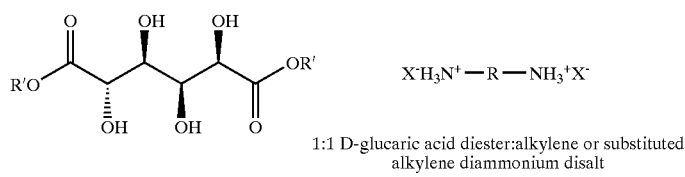

1:1 D-glucaric acid diester:alkylene or substituted alkylene diammonium disalt

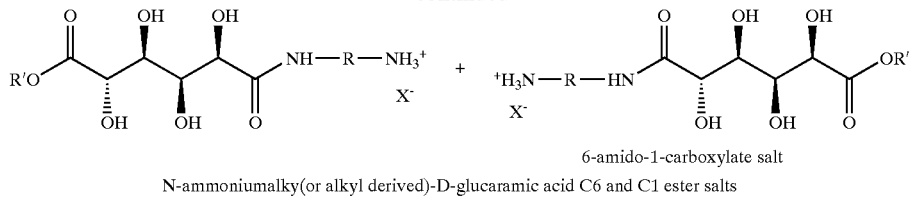

6-amido-1-carboxylate salt
N-ammoniumalky(or alkyl derived)-D-glucaramic acid C6 and C1 ester salts It is observed that if the initial polymerization in step 3 above to make the prepolymer, is done in postpolymerization solvents (step 5 above), high molecular weight polymers, as might be expected, are not formed. The unexpected results, i.e., formation of higher molecular weight polymers from the prepolymerization—postpolymerization routine was found to be superior to making the polymers directly in a solvent or solvent combination directly from the stoichiometrically correct starting material. Employing a stoichiometrically 1:1 ratio of starting diacid component and starting diamine component significantly increases the chances for preparing prepolymers, and then postpolymers with a 1:1 ester:amine end group relationship, thus in effect being living polymers with potential for further polymerization under appropriate conditions. The previously prepared polymers of the same basic structure as described here, but lacking 1:1 ester:amine end group stoichiometric equivalency, were found not to undergo postpolymerization close to the extent observed here under comparable reaction conditions.

The method of the subject invention creates and uses new compositions of matter. These novel compounds include: 1) alkylene (or alkylene derived) diammonium aldarate salts used as the stoichiometrically correct starting materials for the polymerizations, derived from a number of aldaric acids and diamines, 2) 1:1 dimethyl galactarate/alkylene (or alkylene derived) diammonium dichlorides mixtures, and a 1:1 dimethyl xylarate hexamethylenediammonium dichloride mixture, all of which are stoichiometrically correct starting materials for polymerizations; 3) alkylene (or alkylene derived) diammonium D-glucaric acid diester disalts as a mixture with N-ammoniumalkyl (or alkyl derived)-D-glucaramic acid ester salts which are stoichiometrically correct starting materials for polymerizations; 4) post polymers which are at least twice as large as the corresponding prepolymers and represent living polymers capable of further polymerization under appropriate conditions.

The aldaric acids include D-glucaric, meso-xylaric, and meso-galactaric acids plus any other aldaric acids that might be isolated as salts, acyclic diacid form, acid lactone form, or dilactone form. The primary (1°) diamines include all available alkylenediamines (unbranched or branched), alkylenediamines with at least one heteroatom replacing a carbon of the chain, various available arylalkylenediamines, diamines with one or more quaternary ammonium atoms in place of a carbon atom in the chain, and rings with at least two pendant 1° amine groups. Also claimed are procedures for making and purifying the above salts.

The following examples are offered to further illustrate but not limit both the compositions and methods of the present invention. All percentages are by weight and all solvent mixture proportions are by volume unless otherwise noted.

All $^1$H and $^{13}$C NMR spectra were recorded on Varian Unity 400 MHz and 100 MHz, respectively. Samples for $^1$H NMR (ca. 5 mg) were dissolved in 0.7 mL DMSO-d6, D$_2$O or TFA-d1. Solvent evaporations were carried out at reduced pressure. All solvents used were reagent grade unless stated otherwise. Methanol/diamine solutions were standardized by diluting an aliquot of the solution with water and titrating with standardized hydrochloric acid. A pH meter was employed to determine the titration end points. Mn values were obtained using the $^1$H NMR end group analysis method previously described.[12] All organic products or mixtures of products were characterized by $^1$H NMR.

EXAMPLE 1

Preparation of Aqueous D-glucaric Acid (1) Solution

Monopotassium D-glucarate (30.0 g, 120.87 mmol) was spooned into a 2 L Erlenmeyer flask containing deionized water (300.0 mL) and mixed well. Dowex 50WX8 ion-exchange resin (H$^+$ form, 72.0 mL, 2.1 meq/mL) was washed with deionized water until the aqueous wash was colorless. The resin was added to the Erlenmeyer flask and the mixture stirred for 4 h. The resin was removed by filtration, washed with deionized water and stored for regeneration. The filtrate was concentrated to a syrup using a freeze dryer (20.8 g, 108.28 mmol, 89.6%, calculated as 100% D-glucaric acid) and, without further purification, redissolved in deionized water to give a D-glucaric acid (1) aqueous solution (ca. 1 M, 108.3 mL).

Examples 2–9 describe the preparation of alkylene (or alkylene derived) diammonium D-glucarates or alkylene (or alkylene derived) diammonium D-glucarates and 1 and 6[N-ammoniumalkyl](or alkyl derived)-D-glucaramate (salt) mixtures.

EXAMPLE 2

Ethylenediammonium D-glucarate (2a)/1 and 6-[N-(2-ammoniumethyl)]-D-glucaramates (2b and 2c) Mixture Aqueous D-glucaric acid (1, ~1 M, 4.62 mL) and aqueous ethylenediamine (1 M, 6.01 mL) were mixed in a round bottom flask, stirred at room temperature for 10 h and concentrated to less than 25% of the total volume. Methanol (~10 mL) was added drop-wise and the reaction mixture was stirred for 8 h. The top methanol liquid layer was decanted and the light amber syrup was dried under vacuum at room temperature for 24 h to give a mixture of ethylenediammonium D-glucarate (2a) and 1 and 6-[(N-(2-ammoniumethyl)]-D-glucaramates (2b and 2c), 1.13 g, 4.55 mmol, 98.41%).

EXAMPLE 3

Tetramethylenediammonium D-glucarate (3a)

Aqueous D-glucaric acid (~1 M, 5.96 mL) and aqueous tetramethylenediamine (putrescine) (1 M, 8.42 mL) were mixed in a round bottom flask, and stirred at room temperature for 10 min. The reaction mixture was then stirred at 60° C. for 15 h and concentrated to less than 25% of the total volume. Methanol (~5 mL) was added drop-wise to the concentrated solution to precipitate out a large quantity of white solid which was removed by filtration, washed with methanol (2×5 mL), and then dried under vacuum at room temperature for 24 h to give tetramethylenediammonium D-glucarate (3a, 1.13 g, 3.81 mmol, 63.91%).

EXAMPLE 4

Tetramethylenediammonium D-glucarate (3a)/[N-(4-ammoniumbutyl)]-D-glucaramates (3b and 3c) Mixture Aqueous D-glucaric acid (~1 M, 4.95 mL) and aqueous tetramethylenediamine (putrescine) (1 M, 5.15 mL) were mixed in a round bottom flask, and stirred at room temperature for 10 min. The reaction mixture was then stirred at 60° C. for 15 h and concentrated to less than 25% of the total volume. Methanol (~5 mL) was added drop-wise to the concentrated solution to precipitate out a large quantity of white syrupy solid. The top methanol phase was removed and the white solid was washed with methanol (2×5 mL) and then dried under vacuum at room temperature for 24 h to give a mixture of tetramethylenediammonium D-glucarate (3a) and 1 and 6-[(N-(4-aminobutyl)]-D-glucaramates (3b and 3c) (0.69 g, 2.21 mmol, 46.74%).

EXAMPLE 5

Hexamethylenediammonium D-glucarate (4a)[19]

Aqueous D-glucaric acid (1, ~1 M, 5.0 mL) and aqueous hexamethylenediamine (1 M, 5.25 mL) were mixed in a round bottom flask, and stirred at room temperature for 10 min. The reaction mixture was then stirred at 78° C. for 16 h and concentrated to less than 25% of the total volume. Methanol (6~8 mL) was added drop-wise to the concentrated solution to precipitate out a large quantity of white solid which was removed by filtration, washed with methanol (2×5 mL), and dried under vacuum at room temperature for 24 h to give hexamethylenediammonium D-glucarate salt (4a, 1.04 g, 3.19 mmol, 63.71%).

EXAMPLE 6

Hexamethylenediammonium D-glucarate (4a)/1 and 6-[N-(6-ammoniumhexyl)]-D-glucaramates (4b and 4c) Mixture Aqueous D-glucaric acid (1, ~1 M, 5.00 mL) and aqueous hexamethylenediamine (1 M, 5.00 mL) were mixed in a round bottom flask, and stirred at room temperature for 10 min. The reaction mixture was then stirred at 75° C. for 4 h and concentrated to an amber syrup. Methanol (10 mL) was added drop-wise to the concentrated solution and the reaction mixture was stirred for 1 h. The top methanol phase was removed and the light amber syrup was washed with methanol (2×5 mL), and then dried under vacuum at room temperature for 24 h to give hexamethylenediammonium D-glucarate (4a)/1 and 6-[N-(6-ammoniumhexyl)]-D-glucaramates (4b and 4c) (1.36 g, 4.27 mmol, 85%).

EXAMPLE 7

Octamethylenediammonium D-glucarate (5a)/1 and 6-[N-(8-ammoniumooctyl)]-D-glucaramates (5b and 5c) Mixture Aqueous D-glucaric acid (1, ~1 M, 4.51 mL) and aqueous octamethylenediamine (1 M, 5.94 mL) were mixed in a round bottom flask, and stirred at room temperature for 10 min. The reaction mixture was then stirred at 60° C. for 26 h and concentrated to less than 25% of the total volume. Methanol (6~8 mL) was added drop-wise to the concentrated solution and the reaction mixture was stirred for 12 h. The top methanol phase was removed and the light amber syrup was washed with methanol (2×5 mL), and then dried under vacuum at room temperature for 24 h to give octamethylenediammonium D-glucarate (5a)/1 and 6-[N-(8-ammoniumooctyl)]-D-glucaramates (5b and 5c) (1.54 g, 4.35 mmol, 96.43%).

EXAMPLE 8

3,6-Dioxa-1,8-octanediammonium D-glucarate (6a)/ 1 and 6-[N-(8-ammonium-3,6-dioxaoctyl)]-D-glucaramates (6b and 6c) Mixture Aqueous D-glucaric acid (1, 0.972 M, 6.5 mL) and aqueous Jeffamine EDR-148 (3,6-dioxa-1,8-octanediamine, 0.983 g, 6.639 mmol, 6 mL, 1.107 M) were mixed in a round bottom flask, and the reaction mixture was stirred at room temperature for 10 min. The reaction mixture was then stirred at 80° C. for 17.5 h and concentrated to less than 25% of the total volume. Methanol (~15 mL) was added drop-wise to the concentrated solution to try to precipitate out the product. The reaction mixture was placed in ice-bath for 2 h, the top liquid was removed and the product was dried under vacuum at room temperature for 23 h to give a mixture of 3,6-dioxa-1,8-octanediammonium D-glucarate (6a) and 1 and 6-[N-(8-ammonium-3,6-dioxaoctyl)]-D-glucaramates (6b and 6c) (1.18 g, diammonium salt 79.2% & glucaramates 20.8%, ca. 3.33 mmol, 52.65 %).

EXAMPLE 9 m-Xylylenediammonium D-glucarate Salt (7a)/1 and 6-[N-(m-ammoniumxylylene)]-D-glucaramates (7b and 7c) Mixture Aqueous D-glucaric acid (~1 M, 5.60 mL) and aqueous m-xylylenediamine (1 M, 7.27 mL) were mixed in a round bottom flask, and the reaction mixture was stirred at room temperature for 10 h. The reaction mixture was concentrated to less than 25% of the total volume. Methanol (6~8 mL) was added drop-wise to the concentrated solution to precipitate out a large quantity of a light amber solid. The solid was removed by filtration, washed with methanol (2×5 mL), and then dried under vacuum at room temperature for 18 h to give a mixture of m-xylylenediammonium D-glucarate (7a) 1 and 6-[N-(m-ammoniumxylylene)]-D-glucaramates (7b and 7c) (0.99 g, 2.86 mmol, 51.05%).

Examples 10–21 describe the preparation of random poly(alkylene or alkylene derived D-glucaramide pre and post polymers.

EXAMPLE 10

Random poly(ethylene D-glucaramide)Prepolymer (23a)

Acetyl chloride (0.750 mL, 10.548 mmol) was added drop-wise to cold methanol (5.0 mL) while stirring in an ice bath for 20 min to make methanolic/HCl solution. Ethylenediammonium D-glucarate/1 and 6-[N-(2-ammoniummethyl)]-D-glucaramates (0.500 g, 1.85 mmol) was added to this solution and the reaction mixture was stirred at room temperature for 30 min and then sonicated for 10 min. The reaction mixture was concentrated under reduced pressure and then dried under vacuum at room temperature for 4 h to give methanol esterified D-glucaric acid/ethylenediammonium dichloride/methyl 1 and 6-[N-(2-ammoniumethyl)]-D-glucaramates chlorides (i.e., esters/salts). The esters/salts were dissolved in fresh methanol (10 mL) and the solution (pH 1~2, pH paper) made basic by drop-wise addition of triethylamine (0.800 mL) (pH 8~9). Additional triethylamine (0.500 mL) was added after 10 min to keep the basicity of the reaction mixture at about pH 9. A precipitate appeared within 20 min after the second addition of triethylamine. The reaction mixture was stirred at room temperature for 1.0 h and then gradually heated to 65° C. and kept at this temperature for 6 h. to allow for further precipitation. The white solid was removed by centrifugation, washed with methanol (2×5 mL) and dried under vacuum at room temperature for 20 h to give random poly(ethylene D-glucaramide) prepolymer (0.449 g, 1.22 mmol, 77%, dp 5.2, Mn 1,218, estimated Mw 2,500). Repeat unit ($C_8H_{14}N_2O_6$), MW 243.21.

EXAMPLE 11

Random poly(ethylene D-glucaramide)Postpolymer (23b)

Random poly(ethylene D-glucaramide)prepolymer (0.120 g, dp 5.2) prepolymer was dissolved in dimethyl sulfoxide (DMSO, 0.30 mL) at 40° C. The solution temperature was gradually increased to 60° C. over 10 min and the reaction mixture was kept at this temperature for 1 h after drop-wise addition of triethylamine (0.100 mL) to ensure basicity. Methanol (2.0 mL) was added carefully to the solution and a white precipitate was apparent immediately after the addition of methanol. The solution was stirred at 60° C. for an additional 3 h to allow further precipitation. The white solid was separated from solution by centrifugation, washed with DMSO/methanol (1:4) solution (2×3 mL) and dried under vacuum for 12 h to give random poly(ethylene D-glucaramide)postpolymer (0.100 g, 83%, dp 35.4, Mn 8291, estimated Mw 16,996. Repeat unit ($C_8H_{14}N_2O_6$), MW 243.21.)

EXAMPLE 12

Random poly(tetramethylene D-glucaramide) Prepolymer (24a)

Acetyl chloride (0.750 mL, 10.55 mmol) was added drop-wise to cold methanol (5.0 mL) while stirring in an ice bath for 20 min followed by addition of tetramethylenediammonium D-glucarate (0.436 g, 1.492 mmol). The reaction mixture was stirred at room temperature for 30 min, sonicated for 10 min, concentrated under reduced pressure and then dried under vacuum at room temperature for 4 h to give methanol esterified D-glucaric acid/tetramethylenediammonium dichloride (i.e., esters/salt). The ester/salt was dissolved in fresh methanol (10 mL) and the solution (pH 1~2, pH paper) was made basic by drop-wise addition of triethylamine (0.800 mL) (pH 8~9). Additional triethylamine (0.400 mL) was added after 10 min to keep the basicity of the reaction mixture at about pH 9. A precipitate appeared within 30 min after the second addition of triethylamine. The reaction mixture was stirred at room temperature for 1.0 h, warmed gradually to 65° C. and kept at that temp for 6 h to allow for further precipitation. The white solid was removed by centrifugation, washed with methanol (2×5 mL) and dried under vacuum at room temperature for 20 h to give random poly(tetramethylene D-glucaramide) prepolymer (0.180 g, 0.686 mmol, 45.97%, dp 4.75, Mn 1,300). Repeat unit $C_{10}H_{18}N_2O_6$, MW 262.26.

EXAMPLE 13

Random poly(tetramethylene D-glucaramide) Postpolymer (24b)

Random poly(tetramethylene D-glucaramide) (0.399 g, dp 4.75) prepolymer was dissolved in dimethyl sulfoxide (2.00 mL) at 40° C. and the reaction mixture gradually heated to 65° C. over 10 min. The reaction mixture was kept at this temperature for 3 h after drop-wise addition of triethylamine (0.100 mL) to ensure basicity. Methanol (5.0 mL) was added carefully to the solution. A white precipitate was apparent 20 min after the addition of methanol. The solution was kept at 65° C. for an additional 4 h to allow further precipitation. The white solid was separated from solution by centrifugation, washed with DMSO/methanol (1:4) solution (2×3 mL) and then dried under vacuum for 12 h to give random poly(tetramethylene D-glucaramide)postpolymer (0.063 g, 16%, dp 9.74, Mn 2554, estimated Mw 5236). Repeat unit ($C_{10}H_{18}N_2O_6$), MW 262.26.

EXAMPLE 14

Preparation of Random poly(alkylene D-glucaramide) (25a)Prepolymer

Random poly(hexamethylene D-glucaramide)prepolymer. Acetyl chloride (0.750 mL, 10.548 mmol) was added drop-wise into cold methanol (5.0 mL) while stirring in an ice bath for 10 min to make a methanolic/HCl solution. Hexamethylenediammonium D-glucarate (0.5000 g, 1.5337 mmol) was added to the MeOH/HCl solution, the reaction mixture was stirred at room temperature for 10 min and then sonicated for 10 min. The reaction mixture was concentrated under reduced pressure and then dried under vacuum at room temperature for 4 h to give esterified D-glucarate/hexamethylenediammonium dichloride (i.e., ester/salt). The ester/salt was dissolved in fresh methanol (10 mL) and the solution (pH 1~2, pH paper) was made basic by drop-wise addition of triethylamine (0.800 mL) (pH 8~9). Additional triethylamine (0.800 mL) was added after 10 min to keep the basicity of the reaction mixture at about pH 9. A precipitate appeared within 30 min after the second addition of triethylamine. The reaction mixture was stirred at room temperature for 6 h to allow further precipitation. The white solid was removed by centrifugation, washed with methanol (2×10 mL), then acetone (2×10 mL), and dried under vacuum at room temperature for 10 h to give random poly(hexamethylene D-glucaramide)prepolymer (0.2997 g, 1.0323 mmol, dp 6.42, 67.31%, estimated $M_n$ 1,900, estimated $M_w$ 3,800).

EXAMPLE 15

Preparation of Random poly(alkylene D-glucaramide) (25b)Postpolymer

Random poly(hexamethylene D-glucaramide) postpolymer. The random poly(hexamethylene D-glucaramide)prepolymer (100.0 mg) was dissolved in a flask containing warm dimethyl sulfoxide (0.750 mL) while stirring at 40° C. The solution was allowed to stir for 10 min as the temperature was gradually increased to 65° C. Methanol (3.00 mL) was added dropwise into the solution over a 5 min period. The reaction mixture was refluxed for 5 h at 65° C. after the addition of triethylamine (0.120 mL). The solution pH was monitored with pH paper to ensure a basic reaction medium. The white solid was separated by centrifugation and washed with DMSO/methanol (DMSO:methanol 1:4) solution (2×3 mL). The white solid was dried under vacuum for 12 h to give random poly(hexamethylene D-glucaramide)postpolymer (89.70 mg, dp 30.01, 89.70%; estimated $M_n$ 9,000; estimated $M_w$ 18,000).

EXAMPLE 16

Random poly(octamethylene D-glucaramide) Prepolymer (26a)

Acetyl chloride (0.750 mL, 10.1 mmol) was added drop-wise to cold methanol (5.0 mL) while stirring in an ice bath for 20 min followed by addition of octamethylenediammonium D-glucarate (5a)/N-(8-aminooctyl)-D-glucaric acid salts (5b and 5c). The reaction mixture was stirred at room temperature for 30 min, sonicated for 10 min, concentrated under reduced pressure and then dried under vacuum at room temperature for 4 h to give methanol esterified D-glucaric acid/octamethylenediammonium dichloride methyl/1 and 6-[N-(8-ammoniumoctyl)]-D-glucaramates chlorides/(esters/salts). The esters/salts were dissolved in fresh methanol (10.0 mL) and the solution (pH 1~2, pH paper) was made basic by drop-wise addition of triethylamine (0.700 mL) (pH 8~9) at 40° C. Additional triethylamine (0.700 mL) was added after 10 min to keep the basicity of the reaction mixture at about pH 9. A precipitate appeared immediately after the second addition of triethylamine. The temperature of the reaction mixture was gradually increased to 65° C. over 10 min and kept at that temperature for 6 h to allow further precipitation. The white solid was removed by centrifugation, washed with methanol (2×10 mL), then acetone (2×10 mL), and dried under vacuum at room temperature for 10 h to give random poly(octamethylene D-glucaramide)prepolymer (0.350 g, 1.08 mmol, 77.0%, dp 6.6, Mn 2,100). Repeat unit $C_{14}H_{26}N_2O_6$. MW 318.36.

EXAMPLE 17

Random poly(octamethylene D-glucaramide) Postpolymer(26b)

Random poly(octamethylene D-glucaramide) (0.220 g, dp 6.6) prepolymer was dissolved in dimethyl sulfoxide (1.00 mL) at 60° C. The reaction mixture was kept at this temperature for 3 h after drop-wise addition of triethylamine (0.100 mL) to ensure basicity. Methanol (3.0 mL) was added carefully to the solution. A white precipitate was apparent immediately after the addition of methanol. The solution was stirred at 60° C. for an additional 3 h to allow further precipitation. The white solid was separated from solution by centrifugation, washed with DMSO/methanol (1:4) solution (2×3 mL) and then dried under vacuum for 12 h to give random poly(octamethylene D-glucaramide)postpolymer (0.168 g, 76%, dp 19.1, Mn 6,080, estimated Mw 12,460.). Repeat unit $C_{14}H_{26}N_2O_6$. MW 318.36.

EXAMPLE 18

Random Poly(3,6-dioxa-1,8-octamethylene D-glucaramide)Prepolymer (27a)

Acetyl chloride (0.50 mL, 6.73 mmol) was added drop-wise to cold methanol (3.0 mL) while stirring in an ice bath for 20 min followed by addition of syrupy 3,6-dioxa-1,8-octanediammonium D-glucarate (6a)/1 and 6-[N-(8-ammonium-3,6-dioxaoctyl)]-D-glucaramates (6b and 6c) (0.250 g, 0.698 mmol). The reaction mixture was stirred at room temperature for 1 h, sonicated for 10 min, concentrated under reduced pressure and then dried under vacuum at room temperature for 4 h to give methanol esterified D-glucarate/3,6-dioxa-1,8-octamethylenediammonium dichloride/methyl 1 and 6-[N-(8-ammonium-3,6-dioxaoctyl)]-D-glucaramates chlorides (esters/salts). The esters/salts were dissolved in fresh methanol (10 mL) and the solution (pH 2~3, pH paper) was made basic by drop-wise addition oftriethylamine (0.70 mL) (pH 8~9). Additional triethylamine (0.50 mL) was added after 10 min to keep the basicity of the reaction mixture at about pH 9. A white solid precipitate was observed 20 min after the second addition of triethylamine. The reaction mixture was then gradually heated to 65° C. and refluxed at this temperature for 5 h. The white solid was removed by centrifugation, washed with methanol (2×5 mL) and dried under vacuum at room temperature for 10 h to give random poly(3,6-dioxa-1,8-octamethylene D-glucaramide)prepolymer (0.140 g, 78%, 0.435 mmol, dp 6.6, Mn 2,125) Repeat unit $C_{12}O_8N_2H_{22}$. MW 322.

EXAMPLE 19

Random Poly(3,6-dioxa-1,8-octamethylene D-glucaramide)Postpolymer (27b)

Random poly(3,6-dioxa-1,8-octamethylene D-glucaramide) (0.100 g, dp 6.6) prepolymer was dissolved in dimethyl sulfoxide (0.30 mL) at 60° C. The reaction mixture was kept at this temperature for 3 h after drop-wise addition of triethylamine (0.100 mL) to ensure basicity. Methanol (1.0 mL) was added carefully to the solution. An off-white precipitate was apparent immediately after the addition of methanol. The precipitate redissolved and the solution was stirred at 60° C. for an additional 2 h to allow further precipitation. Methanol (2.0 mL) was added after 3 h and a white solid was immediately observed. The solution was allowed to reflux at 60° C. for an additional 3 h. The solid was separated from solution by centrifugation, washed with DMSO/methanol (1:4) solution (2×3 mL) and then dried under vacuum for 12 h to give random Poly(3,6-dioxa-1,8-octamethylene D-glucaramide)postpolymer (0.045 g, 45%, d.p 16.7, Mn 5,377). Repeat unit $C_2H_{22}O_8N_2$. MW 322.31.

EXAMPLE 20

Random poly(m-xylylene D-glucaramide) Prepolymer (28a)

Acetyl chloride (0.750 mL, 10.55 mmol) was added drop-wise to cold methanol (5.0 mL) while stirring in an ice bath for 10 min followed by addition of m-xylylenediammonium D-glucarate (7a)/1 and 6-[N-(m-ammoniumxylylene)]-D-glucaramates (7b and 7c) (0.486 g, 1.403 mmol). The reaction mixture was stirred at room temperature for 10 mim, sonicated for 15 min, concentrated under reduced pressure and then dried under vacuum at room temperature for 4 h to give methanol esterified D-glucaric acid/m-xylenediammonium dichloride/methyl 1 and 6-[N-(m-ammoniumxylylene)]-D-glucaramates chlorides (esters/salts). The esters/salts were dissolved in fresh methanol (10 mL) and the solution (pH 1~2, pH paper) was made basic by dropwise addition of triethylamine (0.800 mL) (pH 8~9). Additional triethylamine (0.400 mL) was added after 10 min to keep the basicity of the reaction mixture at about pH 9. A precipitate appeared within 30 min after the second addition of triethylamine. The reaction mixture was allowed to stir at room temperature and then heated gradually to 65° C. over 10 min. The reaction mixture was kept at 65° C. for 2 hours. Methanol (2.0 mL) was added and minimal white precipitate was observed. The reaction mixture refluxed at 65° C. for an additional 2 h to allow further precipitation. The white solid was removed by centrifugation, washed with methanol (2×5 mL) and dried under vacuum at room temperature for 12 h to give random poly(m-xylylene D-glucaramide)prepolymer (0.193 g, 0.624 mmol 92.10%, dp 3.0, Mn 930). Repeat unit $C_{14}H_8N_2O_6$. MW 310.3.

EXAMPLE 21

Random poly(m-xylylene D-glucaramide) Postpolymer (28b)

Random poly(hexamethylene xylaramide) (0.100 g, dp 24.0) prepolymer was dissolved in dimethyl sulfoxide (0.30 mL) at 60° C. The reaction mixture was kept at this temperature for 3 h after drop-wise addition of triethylamine (0.100 mL) to ensure basicity. Methanol (1.0 mL) was added carefully to the solution. A white precipitate was apparent immediately after the addition of methanol. The precipitate redissolved and the solution was stirred at 60° C. for an additional 2 h to allow further precipitation. Methanol (2.5 mL) was added after 2 h and a white solid was immediately observed. The solution was kept at 60° for an additional 2 h. The solid was separated from solution by centrifugation, washed with DMSO/methanol (1:4) solution (2×3 mL) and then dried under vacuum for 12 h to give randompoly (hexamethylene xylaramide)postpolymer (dp 6.6, Mn 2046).

Example 22 describes the preparation of alkylene diammonium xylarate.

EXAMPLE 22

Hexamethylenediammonium xylarate (8)

Methanolic hexamethylenediamine (5.35 mL, 6.1172 mmol, 1.143 M) was added to methanolic xylaric acid (0.983 g, 5.462 mmol, 6.5 mL, 0.840 M) and a white precipitate appeared within 5 min. The reaction mixture was stirred at room temperature for another 20.5 h and the white solid was removed by filtration, washed with 2×10 mL MeOH, and dried under vacuum at room temperature for 23.5 h to give hexamethylenediammonium xylarate (8, 1.441 g, 4.868 mmol, 89.14%).

Examples 23 and 24 describe the preparation of a poly (alkylene xylaramide)pre and post polymers.

EXAMPLE 23

Poly(hexamethylene xylaramide)Prepolymer (29a)

Acetyl chloride (0.300 mL, 4.01 mmol) was added dropwise to cold methanol (3.0 mL) while stirring in an ice bath for 30 min followed by addition of hexamethylenediammonium xylarate (0.200 g, 0.676 mmol). The reaction mixture was stirred at room temperature for 30 min, sonicated for 5 min, concentrated under reduced pressure and then dried under vacuum at room temperature for 4 h to give 1:1 methanol esterified xylaric acid/hexamethylenediammonium dichloride. The ester/salt was dissolved in fresh methanol (6.0 mL) and the solution (pH 1~2, pH paper) made basic by drop-wise addition of triethylamine (0.500 mL) (pH 8~9). Additional triethylamine (0.400 mL) was added after 10 min to keep the basicity of the reaction mixture at about pH 9. A precipitate appeared 20 min after the second addition of triethylamine. The reaction mixture was allowed to stir at room temperature for 1 h and then gradually heated to 65° C. over 10 min. The reaction mixture was refluxed at 65° C. for 5 h. A white solid was removed by centrifugation, washed with methanol (2×5 mL) and dried under vacuum at room temperature for 18 h to give random poly(hexamethylene xylaramide)prepolymer (0.136 g, 0.493 mmol, 73.1% dp 24, Mn 6,620). Repeat unit $C_{11}H_{20}N_2O_6$, MW 276.

EXAMPLE 24

Poly(hexamethylene xylaramide)Postpolymer (29b)

Random poly(hexamethylene xylaramide) (0.100 g, dp 24.0) prepolymer was dissolved in dimethyl sulfoxide (0.30 mL) at 60° C. The reaction mixture was kept at this temperature for 3 h after drop-wise addition of triethylamine (0.100 mL) to ensure basicity. Methanol (1.0 mL) was added carefully to the solution. A white precipitate was apparent immediately after the addition of methanol. The precipitate redissolved and the solution was stirred at 60° C. for an additional 2 h to allow further precipitation. Methanol (2.5 mL) was added after 2 h and a white solid was immediately observed. The solution was kept at 60° for an additional 2 h. The solid was separated from solution by centrifugation, washed with DMSO/methanol (1:4) solution (2×3 mL) and then dried under vacuum for 12 h to give random poly (hexamethylene xylaramide)postpolymer (0.84 g, 84%, 0.304 mmol, dp>150, Mn ca. 39,000).

Examples 25–31 describe the preparation of galactaric acid alkylenediammonnium salts as monomer sources.

EXAMPLE 25

Ethylenediammonium Galactarate (9)

To a stirred suspension of galactaric acid (5.016 g, 23.870 mmol) in deionized water (25.0 mL) was added ethylenediamine aqueous solution (1.518 g, 25.25 mmol, 1.148 M, 22 mL) and the reaction mixture was then stirred at 60° C. for 1 h and then at room temperature for 25 h. The amount of white solid decreased and then increased during the stirring period. The white solid was removed by filtration, washed with methanol (2×50 mL), and then dried under vacuum at room temperature for 14.5 h to give white solid, ethylenediammonium galactarate (9,5.853 g, 21.66 mmol, 89.76%).

EXAMPLE 26

Tetramethylenediammonium Galactarate (10)

To a stirred suspension of galactaric acid (11.897 g, 56.616 mmol) in deionized water (25.0 mL) was added tetramethylenediamine (putrescine) aqueous solution (4.999 g, 56.72 mmol, 1.418 M, 40.0 mL). The aqueous suspension was stirred at 75° C. for 16 h. Dissolution occurred within the first 15 min and a white precipitate appeared within 30 min. The white solid was removed by filtration, washed with methanol (2×50 mL), and then dried under vacuum at room temperature for 18 h to give white solid, tetramethylenediammonium galactarate (10, 6.775 g, 22.712 mmol, 40.09%).

EXAMPLE 27

Hexamethylenediammonium Galactarate (11)

To a stirred suspension of galactaric acid (5.0 g, 23.794 mmol) and deionized water (50.0 mL) was added hexamethylenediamine (2.77 g, 23.836 mmol) and the reaction mixture was stirred for at 70° C. 1 hour. The reaction mixture was then stirred at room temperature for 24 h. A white precipitate appeared within 30 min, removed by filtration, washed with MeOH (2×50 mL), and then dried under vacuum at room temperature for 24 h to give white solid, hexamethylenediammonium galactarate (11, 5.169 g, 15.838 mmol, 66.52%).

EXAMPLE 28

Dodecamethylenediammonium Galactarate (12)

To a stirred suspension of galactaric acid (5 g, 23.794 mmol) in deionized water (50 mL) was added 1,12-diaminododecane (4.777 g, 23.841 mmol) was added. The reaction mixture was stirred at 70° C. for 2 h followed by stirring at room temperature for 24 h. The white solid was removed by filtration, washed with MeOH (2×10 mL), and then dried under vacuum at room temperature for 24 h to give dodecamethylenediammonium galactarate (12, 9.135 g, 22.253 mmol, 93.43%).

EXAMPLE 29

3,6-Dioxa-1,8-octanediammonium Galactarate (13)

To a stirred suspension of galactaric acid (5.025 g, 23.915 mmol) in deionized water (50 mL), 3,6-dioxa-1,8-octanediamine (3.5 mL, 23.969 mmol) was added using a pipette and the galactaric acid dissolved immediately. The reaction mixture was stirred at room temperature for 16 h, concentrated under reduced pressure, and then washed with methanol (2×50 mL). The product was isolated by filtration and dried under vacuum at room temperature for 24 h to give white solid, 3,6-dioxa-1,8-octanediammonium galactarate (13, 8.547 g, 23.851 mmol, 99.73%).

EXAMPLE 30 m-Xylylenediammonium Galactarate (14)

To a stirred suspension of galactaric acid (5.004 g, 23.811 mmol) in deionized water (50.0 mL), m-xylylenediamine (3.15 mL, 23.868 mmol) was added using a pipette. The reaction mixture was stirred at 70° C. for 16 h. The reaction mixture was filtered, washed with several small portions of deionized water, and then dried under vacuum at room temperature for 24 h to give white solid, m-xylylenediammonium galactarate 14, 6.016 g, 17.372 mmol, 72.88%).

EXAMPLE 31

3,3'-Diamino-N-methyl dipropyldiammonium Galactarate (15)

To a stirred suspension of galactaric acid (5.005 g, 23.818 mmol) in deionized water (50.0 mL), 3,3'-diamino-N-methyl dipropylamine (3.9 mL, 24.192 mmol) was added using a pipette into the galactaric acid aqueous suspension and the reaction mixture was stirred for 2 hours at 75° C. and then at room temperature for 4 h. The solvent was removed under reduced pressure until a dry solid was left in the flask which was then broken up with a metal spatula and the resulting fine powder stirred with methanol (50 mL) for 2 h. The white solid was removed by filtration, washed with methanol (2×20 mL), and then dried under vacuum at room temperature for 24 h to give white solid, 3,3'-diamino-N-methyl dipropylammonium galactarate (15, 8.401 g, 23.640 mmol, 98.62%).

Examples 32–38 describe the preparation of 1:1 Dimethyl galactarate/alkylene (or alkylene derived) diammonium dichlorides as precursors for polymerization.

EXAMPLE 32

1:1 Dimethyl Galactarate/ethylenediammonium Dichloride (16)

Acetyl chloride (0.75 mL) was added drop-wise over a period of 3 min to methanol (25 mL) maintained in an ice-bath. Ethylenediammonium galactarate (9, 0.9963 g, 3.6867 mmol) was then added to the solution and the reaction was allowed to reflux for 4 h. The reactants remained a suspension throughout the course of the reaction. The solvent was removed under reduced pressure leaving a white powder in the flask which was then dried under vacuum at room temperature for 16 h to give white solid 1:1 dimethyl galactarate/ethylenediammonium dichloride (16, 1.239 g, 3.339 mmol, 90.57%).

EXAMPLE 33

1:1 Dimethyl Galactarate/tetramethylenediammonium Dichloride (17)

Acetyl chloride (0.75 mL) was added drop-wise over a period of 5 min to methanol (25 mL) maintained in an ice-bath. Tetramethylenediammonium galactarate (10, 1.001 g, 3.355 mmol) was then added to the solution and the reaction mixture was allowed to reflux for 4 h. The reactants remained a suspension through the course of the reaction. The solvent was removed under reduced pressure and the remaining powder was dried under vacuum at room temperature for 16 h to give white solid 1:1 dimethyl galactarate/tetramethylenediammonium dichloride (17, 1.304, 3.266 mmol, 97.35%).

EXAMPLE 34

1:1 Dimethyl Galactarate/hexamethylenediammonium Dichloride (18)

Acetyl chloride (0.75 mL) was added drop-wise over a period of 5 minutes to methanol (25 mL) maintained in an ice-bath. Hexamethylenediammonium galactarate (11, 1.016 g, 3.113 mmol) was then added to the solution and the reaction mixture was refluxed for 4 h. Within 30 min complete dissolution had occurred. After 4 h the solvent was removed under reduced pressure and the remaining white powder was dried under vacuum at room temperature for 16 h to give white solid 1:1 dimethyl galactarate/hexamethylenediammonium dichloride (18, 1.154, 2.670 mmol, 86.73%).

EXAMPLE 35

1:1 Dimethyl Galactarate/dodecamethylenediammonium Dichloride (9)

Acetyl chloride (2 mL) was added drop-wise over a period of 5 min to methanol (25 mL) maintained in an ice-bath. Dodecamethylenediammonium galactarate (12, 0.998 g, 2.431 mmol) was then added to the solution and the reaction mixture was allowed to reflux for 4 h. Within 30 min complete dissolution had occurred. The solvent was then removed under reduced pressure and the remaining white powder dried under vacuum at room temperature for 16 h to give white solid 1:1 dimethyl galactarate/dodecamethylenediammonium dichloride (19, 1.150 g, 2.248 mmol, 92.47%).

EXAMPLE 36

1:1 Dimethyl Galactarate/m-xylenediammonium Dichloride (20)

Acetyl chloride (2 mL) was added drop-wise over a period of 5 min to methanol (25 mL) maintained in an ice-bath. m-Xylylenediammonium galactarate (14, 1.008 g, 2.910 mmol) was then to the solution and the reaction was allowed to reflux for 4 h. Within 1 h complete dissolution had occurred. The solvent was removed under reduced pressure and the remaining white powder dried under vacuum at room temperature for 16 h to give white solid 1:1 dimethyl galactarate/m-xylylenediammonium dichloride (20, 1.158 g, 2.588 mmol, 88.94%).

EXAMPLE 37

1:1 Dimethyl Galactarate/3,6-dioxaoctamethylenediammonium Dichloride (21)

Acetyl chloride (2 mL) was added drop-wise over a period of 5 min to methanol (25 mL) maintained in an ice-bath. 3,6-Dioxa-1,8-octanediammonium galactarate (13, 1.115 g, 3.111 mmol) was then added to the solution and the reaction was allowed to reflux for 4 h. Within 30 min complete dissolution had occurred. The solvent was then removed under reduced pressure and the remaining white powder dried under vacuum at room temperature for 16 h to give white solid 1:1 dimethyl galactarate/3,6-dioxa-1,8-octanediammonium dichloride (21, 1.250 g, 2.722 mmol, 87.49%).

EXAMPLE 38

1:1 Dimethyl Galactarate/3,3'-diamino-N-methyl dipropyldiammonium Trichloride (22)

Acetyl chloride (2 mL) was added dropwise over a period of 5 min to methanol (25 mL) maintained in an ice-bath. 3,3'-Diamino-N-methyl dipropylammonium galactarate (15, 1.004 g, 2.825 mmol) was added to the solution and the reaction was allowed to reflux for 4 h. Complete dissolution occurred almost immediately. The solvent was then removed under reduced pressure and the remaining white powder was dried under vacuum at room temperature for 16 h to give white solid 1:1 dimethyl galactarate/3,3'-diamino-N-methyl dipropyldiammonium trichloride (22, 1.390 g, 2.821 mmol, 99.86%).

Examples 39–52 describe the preparation of poly(galactaramide)pre and postpolymers.

EXAMPLE 39

Poly(ethylene Galactaramide) (30a) Prepolymer

Dimethyl galactarate/ethylenediammonium dichloride (16, 0.546 g, 1.470 mmol) was added with stirring to methanol (20 mL) followed by triethylamine (4 mL). The reaction mixture was held at 70° C. for 16 h. During the first few minutes of heating, complete dissolution occurred but within 1 h of heating a precipitate began to form, continuing over the course of the reaction. The solid white product was separated by filtration, washed with fresh methanol (2×10 mL), and then dried under vacuum at room temperature for 16 h to give poly(ethylene galactaramide) (23, 0.265 g, 1.131 mmol, 77%, dp from $^1$H NMR indeterminable—end group not visible). Repeat unit $C_8H_{14}N_2O_6$, MW 234.21.

EXAMPLE 40

Poly(ethylene Galactaramide) (30b) Postpolymer

Poly(ethylene galactaramide)prepolymer (23, 0.102 g, 0.435 mmol) was swelled in DMSO (1 mL) at 50° C. for 2 h. The reaction mixture was cooled to room temperature, additional methanol (4 mL) was added, and stirring continuing for an additional 2 h. The precipitate was isolated by filtration and the polymer was stirred with fresh methanol (5 mL). It was filtered again, the powder collected and dried under vacuum at room temperature for 16 h. The product post poly(ethylene galactaramide) (29, 0.08 g, 78.31%, dp from $^1$H NMR indeterminable—no visible end groups). Repeat unit $C_8H_{14}N_2O_6$ MW 234.21.

EXAMPLE 41

Poly(tetramethylene Galactaramide) (31a) Prepolymer

Dimethyl galactarate/tetramethylenediammonium dichloride (17, 1.474 g, 3.69 mmol) was added with stirring to methanol (40 mL) followed by triethylamine (10 mL). The reaction mixture was maintained at 70° C. for 16 h, with complete dissolution occurring within a few min, followed by precipitate formation within 1 h and continuing over the course of the reaction. The solid white product was separated by filtration, washed with fresh methanol (2×10 mL), then dried under vacuum at room temperature for 16 h to give poly(tetramethylene galactaramide) (24, 0.863 g, 3.29 mmol, 89.17%, dp 10, Mn 2,600). Repeat unit $C_{10}H_{18}N_2O_6$, MW 290.31

EXAMPLE 42

Poly(tetramethylene Galactaramide) (31b) Postpolymer

Poly(tetramethylene galactaramide)prepolymer (24, 0.105 g, 0.400 mmol) was swelled in DMSO (1 mL) at 50° C. for 2 h. The temperature was then raised to 60° C. and methanol (2 mL) was added dropwise to the reaction mixture followed by triethylamine (0.1 mL). The reaction mixture was held at 60° C. for 24 h, cooled to room temperature, additional methanol (4 mL) was added and the reaction mixture stirred for an additional 2 h. The precipitate was isolated by filtration, the solid was stirred with fresh methanol (5 mL), filtered again, and dried under vacuum at room temperature for 16 h. The product post poly(tetramethylene galactaramide) (30, 0.071 g, 67.78%) was insoluble in standard solvents used for these polymers, including TFA, whereas the prepolymer was soluble in $D_2O$. Thus, a major increase in the dp is concluded to have occurred as increased molecular weight typically lowers solubility. Repeat unit $C_{10}H_{18}N_2O_6$, MW 262.26.

EXAMPLE 43

Poly(hexamethylene Galactaramide) (32a) Prepolymer

Dimethyl galactarate/hexamethylenediammonium dichloride (18, 0.502 g, 1.175 mmol) was added with stirring to methanol (20 mL) followed by triethylamine (3.3 mL). The reaction mixture was held at 70° C. for 16 h. During the first few minutes of heating complete dissolution occurred followed by precipitate formation 1 h and continuing throughout the reaction period. The solid white product was separated by filtration, washed with fresh methanol (2×10 mL) and then dried under vacuum at room temperature for 16 h to give poly(hexamethylene galactaramide) (25, 0.248 g, 0.856 mmol, 72.79%, dp $^1$H NMR 6.2, Mn 1,800). Repeat unit $C_{12}H_{22}N_2O_6$, MW 290.31

EXAMPLE 44

Poly(hexamethylene Galactaramide) (32b) Postpolymer

Poly(hexamethylene galactaramide)prepolymer (25), 0.100 g, 0.345 mmol) was swelled in DMSO (1 mL) at 50°

C. for 2 h and then the temperature was then raised to 60° C. Methanol (2 mL) was added dropwise to the reaction mixture followed by triethylamine (0.1 mL). The reaction mixture was held at 60° C. for 24 h, then cooled to room temperature, more methanol (4 mL) was added, and the reaction mixture was stirred for an additional 2 h. The precipitate was isolated by filtration and stirred with fresh methanol (5 mL). It was filtered again, the powder collected and dried under vacuum at room temperature for 16 h to give the product post poly(hexamethylene galactaramide) (31, 0.075 g, 75%, dp 14.28, Mn 4,150). Repeat unit $C_{12}H_{22}O_6$, MW 290.31.

EXAMPLE 45

Poly(dodecamethylene Galactaramide) (33a) Prepolymer

Dimethyl galactarate/dodecamethylenediammonium dichloride (19, 0419 g, 0819 mmol) was added with stirring to methanol (20 mL) followed by triethylamine (2.3 mL). The reaction mixture was held at 70° C. for 16 h. During the first few minutes of heating complete dissolution occurred followed by precipitate formation within 1 h precipitation started to occur and continuing over the reaction period. The solid white product was separated by filtration, washed with fresh methanol (2×10 mL), and the solid product was then dried under vacuum at room temperature for 16 h to give poly(dodecamethylene galactaramide) (26, 0.189 g, 0.504 mmol, 61.53%, dp $^1$H NMR 14.3, Mn 5,350). Repeat unit $C_{18}H_{34}N_2O_6$, MW 374.48.

EXAMPLE 46

Poly(dodecamethylene Galactaramide) (33b) Postpolymer

Poly(dodecamethylene galactaramide)prepolymer (26, 0.099 g, 0.265 mmol) was swelled in DMSO (1 mL) at 50° C. for 2 h. The temperature was then raised to 60° C. Methanol (2 mL) was added dropwise to the reaction mixture followed by triethylamine (0.1 mL). The reaction mixture was held at 60° C. for 24 h, cooled to room temperature, more methanol (4 mL) was added and the reaction mixture stirred for an additional 2 h. The precipitate was isolated by filtration, stirred with fresh methanol (5 mL), filtered again and dried under vacuum at room temperature for 16 h. The product post poly(dodecamethylene galactaramide) (32, 0.071 g, 72.7 %, dp 14.3, Mn 5,350). Repeat unit $C_{18}H_{34}N_2O_6$, MW 374.48.

EXAMPLE 47

Poly(3,6-dioxaoctamethylene Galactaramide) (33a) Prepolymer

Dimethyl galactarate/3,6-dioxa-1,8-octanediammonium dichloride (21, 0.519 g, 1.13 mmol) was added with stirring to methanol (20 mL) followed by triethylamine (3.2 mL). The reaction was held at 70° C. for 16 h. During the first few minutes of heating complete dissolution occurred followed by precipitate formation within 1 h and continuing over the course of the reaction. The solid white product was separated by filtration, washed with fresh methanol (2×10 mL) and then dried under vacuum at room temperature for 16 h to give poly(3,6-dioxaoctamethylene galactaramide) (27), 0.335 g, 1.04 mmol, 92.0%, dp 14.3, Mn 5,350). Repeat unit $C_{12}H_{22}N_2O_8$, MW 322.31.

EXAMPLE 48

Poly(3,6-dioxa-octamethylene Galactaramide) (34b) Postpolymer

Poly(3,6-dioxaoctamethylene galactaramide)prepolymer (27, 0.1062 g, 0.3294 mmol) was swelled in DMSO (1 mL) at 50° C. for 2 h and then the temperature was then raised to 60° C. Methanol (2 mL) was added dropwise to the reaction mixture followed by triethylamine (0.1 mL) and the reaction mixture was held 60° C. for 24 h. The reaction mixture was then cooled to room temperature, more methanol (4 mL) was added, and the reaction mixture stirred for an additional 2 h. The precipitate was isolated by filtration, stirred with fresh methanol (5 mL), filtered again and dried under vacuum at room temperature for 16 h. The product post poly(3,6-dioxaoctamethylene galactaramide) (32, 0.082 g, 77.4%, dp 26.4, Mn 8, 500). Repeat unit $C12H_{22}N_2O_8$, MW 322.21.

EXAMPLE 49

Poly(m-xylylene Galactaramide) (35a) Prepolymer

Dimethyl galactarate/m-xylylenediammonium dichloride (20, 0.506 g, 1.131 mmol) was added with stirring to methanol (20 mL) followed by of triethylamine (3.15 mL). The reaction mixture was held at 70° C. for 16 h. During the first few minutes of heating complete dissolution occurred followed by precipitate formation within 1 h and continuing over the course of the reaction. The solid white product was separated by filtration, washed with fresh methanol (2×10 mL) and then dried under vacuum at room temperature for 16 h to give poly(m-xylylene galactaramide) (28, 0.321 g, 1.034 mmol, 91.44%, dp 11.8, Mn 3,650). Repeat unit $C_{14}H_{18}N_2O_6$, MW 310.3.

EXAMPLE 50

Poly(m-xylylene Galactaramide) (35b) Postpolymer

Poly(m-xylylene galactaramide)prepolymer (28, 0.104 g, 0.335 mmol) was swelled in DMSO (1 mL) at 50° C. for 2 h. The temperature of the reaction mixture was then raised to 60° C. and methanol (2 mL) was added dropwise to the reaction mixture followed by triethylamine (0.1 mL). The reaction mixture was held at 60° C. for 24 h, cooled to room temperature, more methanol (4 mL) was added, and it was stirred for an additional 2 h. The precipitate was isolated by filtration, stirred with fresh methanol (5 mL), filtered again and dried under vacuum at room temperature for 16 h. The product post poly(m-xylylene galactaramide) (33, 0.088 g, 84.34%, dp 33, Mn 10,200). Repeat unit $C_{14}H_{18}N_2O_6$, MW 310.3.

EXAMPLE 51

Poly(4'-aza-N-methylheptamethylene Galactaramide) (36a) Prepolymer

Dimethyl galactarate/4-aza-N-methylheptamethylenediammonium trichloride (3,3'-diammonium-N-methyl dipropylamine dichloride), (22, 0.524 g, 1.063 mmol) was added with stirring to methanol (20 mL) followed by triethylamine (3.2 mL). The reaction was held at allowed to proceed at 70° C. for 16 h During the first few minutes of heating complete dissolution occurred followed by precipitate formation within 1 h and continuing over the course of the reaction. The solid white product was separated by filtration, washed with fresh methanol(2×10 mL) The powder was then dried under vacuum at room temperature for 16 h to give poly(4'-aza-N-methylheptamethylene galactaramide) (29, 0.252 g, 0.708 mmol, 66.61%, dp 25, Mn 8,900). Repeat unit $C_{13}H_{25}N_3O_6$, MW 319.36

EXAMPLE 52

Poly(4'-aza-N-methylheptamethylene Galactaramide) (36b) Postpolymer

Poly(4'-aza-N-methylheptamethylene galactaramide) prepolymer (28, 0.100 g, 0.345 mmol) was swelled in DMSO (1 mL) at 50° C. for 2 h. The temperature of the reaction mixture was then raised to 60° C., methanol (2 mL) was added dropwise followed by triethylamine (0.1 mL) and the reaction mixture was held at 60° C. for 24 h. The reaction was then cooled to room temperature, more methanol (4 mL) was added, and the reaction mixture was stirred for an additional 2 h. The precipitate was isolated by filtration, stirred with fresh methanol (5 mL), filtered again and dried under vacuum at room temperature for 16 h. The product post poly(hexamethylene galactaramide) (34, 0.077 g, 77.12%, dp to large to measure by the $^1$H NMR method as the there were no visible end groups). Molecular Formula of repeat unit $C_{13}H_{25}N_3O_6$, MW 319.36.

TABLE 1

Molecular weight increase in pre to postpolyamides using the processes described.

| Pre Polym | dp | Mn | Post Polym | dp | Mn | Mw[#] | MnPost/MnPre |
|---|---|---|---|---|---|---|---|
| 23a | 5.2 | 1,217 | 23b | 35.4 | 8,291 | 16,900 | 3.3 |
| 24a | 4.8 | 1,300 | 24b | 9.74 | 2,554 | 5,236 | 2.0 |
| 25a | 6.4 | 1,900 | 25b | 30 | 9,000 | 18,500 | 4.7 |
| 26a | 6.6 | 2,100 | 26b | 19.1 | 6,080 | 12,400 | 1.5 |
| 27a | 6.6 | 2,000 | 27b | 17.0 | 5,500 | 11,000 | 2.75 |
| 28a | 3.0 | 930 | 28b | 6.6 | 2,400 | 4,900 | 2.2 |
| 29a | 24 | 6,620 | 29b | >150 | >39,000 | | >6 |
| 30a | * | * | 30b | * | * | | |
| 31a | 10 | 2,640 | 31b | ** | ** | | |
| 32a | 6.2 | 1,800 | 32b | 14 | 4,150 | 8,500 | 4.7 |
| 33a | 14.3 | 5,350 | 33b | | | | |
| 34a | 7.6 | 2,447 | 34b | 26.4 | 8,500 | 17,400 | 3.5 |
| 35a | — | — | 35b | — | — | | |
| 36a | 25 | 8,900 | 36b** | — | — | | —** |

* The end group protons signal was too small to measure indicating a large dp value.
**Polymer no longer soluble because of increased size and measurement not obtained.
[#]These are estimated lower end values based on ca. 2 × Mn values.
**The values for 29b are based on a polymer end group integration that was too small to be measured with accuracy. The numbers given are low end numbers based on the estimated integration.

It should be understood that the examples and embodiments described herein are for illustrative purposes only and that various modifications or changes in light thereof will by suggested to persons skilled in the art and are to be included within the spirit and purview of this application and the scope of any appended claims.

References

1. N. Ogata and Y. Hosoda, *J. Polym. Sci., Polym. Lett. Ed.*, 12, 355 (1974).
2. N. Ogata and Y. Hosoda, *J. Polym. Sci., Polym. Chem. Ed.*, 13, 1793 (1975)
3. N. Ogata, K. Sanui, Y. Hosada and H. Nakamura, *J. Polym. Sci., Polym. Chem. Ed.*, 14, 783 (1976).
4. N. Ogata and K. Sanui, *J. Polym. Sci., Polym. Chem. Ed.*, 15, 1523 (1977).
5. N. Ogata, K. Sanui and K. Iijima, *J. Polym. Sci., Polym. Chem. Ed.*, 11, 1095 (1973).
6. N. Ogata and S. Okamoto, *J. Polym. Sci., Polym. Chem. Ed.*, 11, 2537 (1973).
7. Ogata, *Polym. Prepr.*, 17, 151 (1976).
8. N. Ogata, K. Sanui, H. Nakamura and M. Kuwahara, *J. Polym. Sci., Polym. Chem. Ed.*, 18, 939 (1980).
9. T-H. Lin, Ph. D. Dissertation, The University of Alabama at Birmingham, 1987.
10. D. E. Kiely and T-H. Lin, U.S. Pat. No. 4,833,230, May 23, 1989.
11. L. Chen, Ph.D. Dissertation, The University of Alabama at Birmingham, 1992.
12. D. E. Kiely, L. Chen and T-H Lin, *J. Am. Chem. Soc.*, 116, 571 (1994).
13. K. Hashimoto, M. Okada and N. Honjou, *Makromol. Chem., Rapid Comm.*, 11, 393 (1990).
14. K. Hashimoto, S. Wibullucksanakul, M. Mausuura and M. Okada, *J. Polym. Sci., Polym. Chem. Ed.*, 31,3141 (1993).
15. P. D. Hoagland, H. Pessen and G. G. McDonald, *J. Carbohydr. Chem.*, 6, 495 (1987).
16. D. E. Kiely, L. Chen, and T-H Lin, *J. Polym. Sci.; Polym Chem. Ed*, 38, 594 (2000).
17. H. R. Allcock and F. W. Lampe, "Contemporary Polymer Chemistry", $2^{nd}$ ed., 1990, Prentice Hall, Englewood Cliffs, N.J.
18. David W. Morton and Donald E. Kiely, *J. Polym. Sci.; Polym. Chem. Ed.*, 38, 604 (2000).
19. E. Muraki, JP 48032997, May 5, 1973; JP 50029758, Sep. 6, 1975. This patent described the use of ammonium salts of hydroxyl group containing dicarboxylic acids, including hexamethylenediammonium glutarate [42543-39-5] to make fire-resistant polyamides by heating said salts over $P_2O_2$.

What is claimed is:

1. A method of preparing random polyhydroxypolyamides, the method comprising the steps of:
    a) forming a stoichiometrically molar balanced (1:1) aldaric acid:alkylenediamine (or alkylene derived) salt;
    b) esterifying the aldaric acid unit of the alkylene or alkylene derived diammonium aldarate with an alcohol comprising an acid catalyst;
    c) polymerizing the molar balanced (1:1) esterified aldaric acid:diammonium disalt in basified alcohol to form a random prepolymer; and
    d) polymerizing the random prepolymer in a solvent to form the random polyhydroxypolyamide.

2. The method of claim 1, wherein the following is substituted:
    forming a stoichiometrically molar balanced 1:1 aldaric acid:alkylenediamine (or alkylene derived) salt and a N'-ammoniumalkyl (or alkyl derived)-aldaramic acid terminal carboxylate zwitterionic salt mixture, the mixture being then esterified as in b) to the 1:1 esterified aldaric acid:alkylene (or alkylene derived) diammonium salt in mixture with the esterified N-ammoniumalkyl (or alkyl derived)-aldaramic acids, that mixture then being polymerized and postpolymerized as in steps c) and d).

* * * * *

UNITED STATES PATENT AND TRADEMARK OFFICE
CERTIFICATE OF CORRECTION

PATENT NO. : 6,894,135 B2
DATED : May 17, 2005
INVENTOR(S) : Keily et al.

It is certified that error appears in the above-identified patent and that said Letters Patent is hereby corrected as shown below:

Column 2,
Line 63, "$H^{30}$" should read -- $H^+$ --.

Column 16,
Line 41, "$C_2H_{22}O_8N_2$" should read -- $C_{12}H_{22}O_8N_2$ --.

Column 17,
Line 8, "$C_{14}H_8N_2O_6$" should read -- $C_{14}H_{18}O_2N_6$ --.

Signed and Sealed this

Twenty-eighth Day of March, 2006

JON W. DUDAS
*Director of the United States Patent and Trademark Office*